US007310864B1

(12) United States Patent
Gingerich

(10) Patent No.: US 7,310,864 B1
(45) Date of Patent: Dec. 25, 2007

(54) TOOL FOR PERFORMING MAINTENANCE ON THE ENDLESS TRACKS OF A TRACKED VEHICLE

(76) Inventor: Jake A. Gingerich, 2100 Clay's Fork Rd., Columbia, MO (US) 65202

( * ) Notice: Subject to any disclaimer, the term of this patent is extended or adjusted under 35 U.S.C. 154(b) by 0 days.

(21) Appl. No.: 11/588,889

(22) Filed: Oct. 30, 2006

(51) Int. Cl.
*B23P 19/04* (2006.01)

(52) U.S. Cl. .............................. 29/256; 29/255; 269/6; 269/246; 269/147

(58) Field of Classification Search .................. 29/256, 29/255; 269/147, 166–171, 246, 6, 3
See application file for complete search history.

(56) References Cited

U.S. PATENT DOCUMENTS 3,738,613 A * 6/1973 Hollis, Jr. ................... 254/420
3,816,000 A 6/1974 Fiedler
4,283,828 A 8/1981 Cole, Sr.
4,709,474 A 12/1987 Eckert
5,426,841 A 6/1995 Peterson
6,089,556 A * 7/2000 Whiteford ................... 269/149
6,554,264 B1 * 4/2003 Alford ........................ 269/147
7,114,715 B1 * 10/2006 Kirk ........................... 269/147

* cited by examiner

*Primary Examiner*—Lee D. Wilson
(74) *Attorney, Agent, or Firm*—Theresa M. Seal

(57) ABSTRACT

A tool for the installation, removal and tightening of endless tracks of a tracked vehicle includes a first tubular member that telescopically receives a second tubular member with a rotatable handle mounted to the first tubular member opposite the second tubular member and a threaded rod interconnected to the handle and axially extending within and through both tubular members for engagement to a threaded nut fixedly mounted within the bore of the second tubular member and the underside of each tubular member including a track bar hook that can be hooked on to the cross bars of successive track sections of the endless track with clockwise rotation of the handle causing the telescoping retraction of the second tubular member for decreasing the distance between successive track sections and for increasing tension on the endless tracks and counterclockwise rotation of the handle for relieving tension on the tracks in order to facilitate the desired maintenance on the endless tracks.

18 Claims, 3 Drawing Sheets

TOOL FOR PERFORMING MAINTENANCE ON THE ENDLESS TRACKS OF A TRACKED VEHICLE

FIELD OF THE INVENTION

The present invention pertains to tools for performing maintenance on machinery and equipment, and more particularly pertains to a tool for performing maintenance on the endless steel tracks of a skid loader and other tracked vehicles.

BACKGROUND OF THE INVENTION

Machinery and equipment such as skid loaders require various types of repairs and maintenance to keep them operational in demanding and difficult environments. The endless steel tracks of the skid loader are one structural component that requires regular maintenance. Thus, the endless tracks must be tightened on a regular basis (after every 300 to 500 man hours) to prevent slippage and to compensate for the normal wear on the tracks. Occasions will also arise when the endless tracks need removed for repair or for removal of an old, worn out endless track and the installation of a new endless track. In all these cases the slack in the endless track must be taken up or released to facilitate the installation or removal of the endless track. One standard device for taking up or relaxing the slack (tension) on the endless track is to use a nylon ratchet strap that is often included with the purchase of a skid loader. However, this device has serious shortcomings and is not regarded as a satisfactory tool for performing such maintenance on the endless tracks of a skid loader. Two primary shortcomings of the nylon ratchet strap are that the nylon strap doesn't keep the track sections of the track straight nor does the nylon strap provide for the take up or release of tension on the track in small enough increments so that bolt line up is difficult and cumbersome. The prior art does disclose a range of devices for performing maintenance on the wheels and tracks of machinery and vehicles.

For example, the Fiedler patent (U.S. Pat. No. 3,816,000) discloses a three axes alignment means for aligning electronic and optical equipment and that includes a laser, a beam splitter and an angle sensing detection means.

The Cole, Sr. patent (U.S. Pat. No. 4,283,828) discloses an endless track support tool for removing and replacing support and guidance rollers and which includes a pair of adjustment means one of which moves a traveling block and the roller in a horizontal direction and the other adjustment means for moving the traveling block and the roller in the vertical direction.

The Eckert patent (U.S. Pat. No. 4,709,474) discloses a tractor dual wheel remover for loosening the frictional engagement of the rim of a spacer wheel from the rim extension of a main wheel, and which includes an elongate member having a shaft and nut for engaging the rim extension and breaking the frictional engagement of the rims of the wheels from each other.

The Peterson patent (U.S. Pat. No. 5,426,841) discloses a method and tool for removing and replacing a vehicle wheel and which includes a track that can be interconnected to both the axle and the vehicle wheel with the track including a movable carriage and wheel support for removing the wheel.

Nonetheless, despite the ingenuity of the above devices, there remains a need for a tool that easily, quickly and reliably performs maintenance on the endless tracks of machinery and equipment so that slippage and other deficiencies in the operation of the endless tracks can be prevented.

BACKGROUND OF THE INVENTION

The present invention comprehends a lightweight, portable tool for performing various types of maintenance on the endless steel tracks of machinery and equipment, with an especial emphasis on maintenance for the endless steel tracks of equipment commonly referred to as skid loaders. Such maintenance includes the installation, removal and tightening of the steel tracks with the tool of the present invention adapted to perform such functions in a fast, easy, timesaving manner.

The tool of the present invention comprehends a first tubular member having a bore and a handle end and an opposite distal second end. Mounted at the handle end is an external handle that is capable of both pivotal and rotatable (clockwise and counterclockwise) motion. Disposed within the first tubular member at the handle end is a thrust bearing and extending from the thrust bearing within the bore is a threaded rod. The threaded rod includes right-handed threads. The threaded rod extends substantially the length of the bore and is interconnected to the handle so that rotation of the handle (in either aforementioned direction) results in the concomitant rotation of the threaded rod.

Disposed partially within the first tubular member is a second tubular member. The second tubular member is capable of telescopic retraction and advancement relative to the first tubular member. The second tubular member also includes a second bore coextensive therewith and an inner end that is always encompassed within the bore of the first tubular member irrespective of the amount of advancement of the second tubular member during the use of the tool. Fixedly mounted at the inner end of the second tubular member is a nut, and the threaded rod engages and extends through the nut so that at all times a portion of the length of the threaded rod is located within the second bore of the second tubular member.

Each tubular member includes a track bar hook and the track bar hooks are generally l-shaped and project inwardly toward each other and are located on the bottom of the tool. The track bar hooks are secured to the cross bars of two adjacent and successive track sections. Thus, clockwise rotation of the handle rotates the threaded rod against the nut and causes the second tubular member to withdraw or retract within the first tubular member while counter clockwise rotation of the handle causes the counter clockwise rotation of the threaded rod against the nut and results in the linear advancement of the second tubular member relative to the first tubular member. Generally, after the hooks are hooked about opposite cross bars of adjacent track sections, clockwise rotation of the handle tightens the tension on the connecting bolts for the links that hold the adjacent track sections together while counter clockwise rotation of the handle slackens the tension on the connecting bolts for the links that hold the adjacent track sections together.

It is an objective of the present invention to provide a tool for performing maintenance on endless steel tracks and which facilitates the fast and easy installation, removal and tightening of the tracks on the equipment.

It is another objective of the present invention to provide a tool for performing maintenance on endless steel tracks that greatly reduces the time and effort required for the installation, removal and tightening of the endless tracks.

It is yet another objective of the present invention to provide a tool for performing maintenance on endless steel tracks that contractors, construction companies, and landscapers would find useful and desirable.

It is still yet another objective of the present invention to provide a tool for performing maintenance on endless steel tracks that easily and quickly attaches to successive track sections of the track for decreasing the tension on adjacent track sections to facilitate the installation and removal of the endless tracks.

Yet another objective of the present invention is to provide a tool for performing maintenance on endless steel tracks wherein less time and effort is required for maintenance because of the capability of the tool to take up or release tension in increments that can be as small as 0.001 (increments measured in thousandths of an inch).

Yet still another objective of the present invention is to provide a tool for performing maintenance on the endless steel tracks wherein the retraction and extension of the tool with respect to adjacent track sections of the track is in minute (thousandths of an inch) increments thereby making alignment of the bolt holes in the adjacent track sections easy and effortless.

These and other objects, features and advantages will become apparent to those skilled in the art upon a perusal of the following detailed description read in conjunction with the accompanying drawing figures and appended claims.

DETAILED DESCRIPTION OF THE PREFERRED EMBODIMENT

With reference to FIGS. 1-6 a tool 10 is shown for performing maintenance on tracked vehicles, machinery and equipment, and is particularly adapted for performing the installation, removal and tightening of the endless steel tracks of a skid loader in a fast and easy manner. Moreover, the tool 10 of the present invention is lightweight, durable, and portable, and is designed to greatly reduce the time and effort involved in performing the aforedescribed maintenance on a tracked vehicle such as a skid loader.

Figure 2:
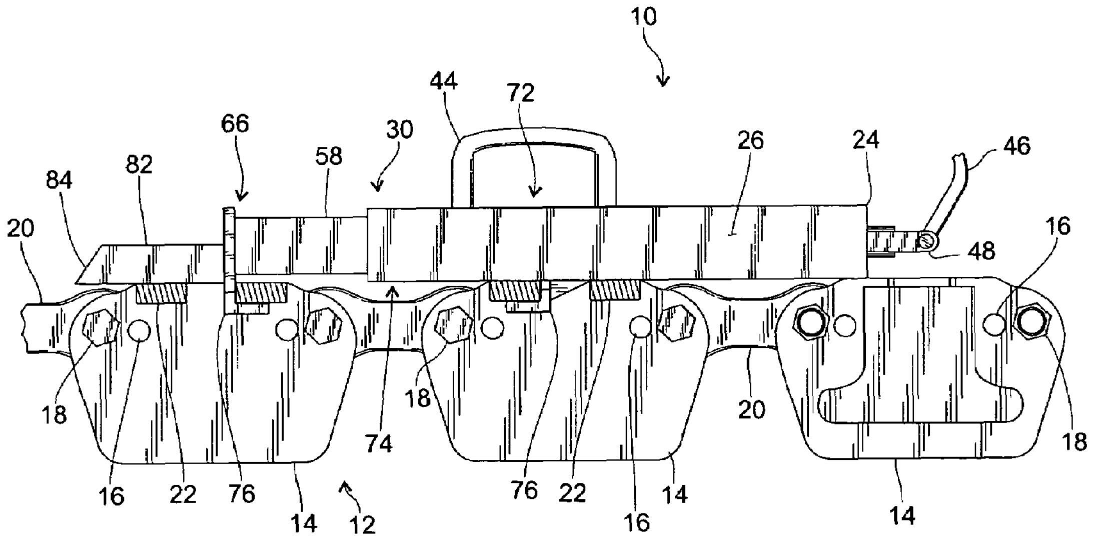
FIG. 2 is a side elevational view of the tool first shown in FIG. 1 illustrating the mounting of the tool on successive track sections of the endless track for performing maintenance on the endless track.
Figure 3:
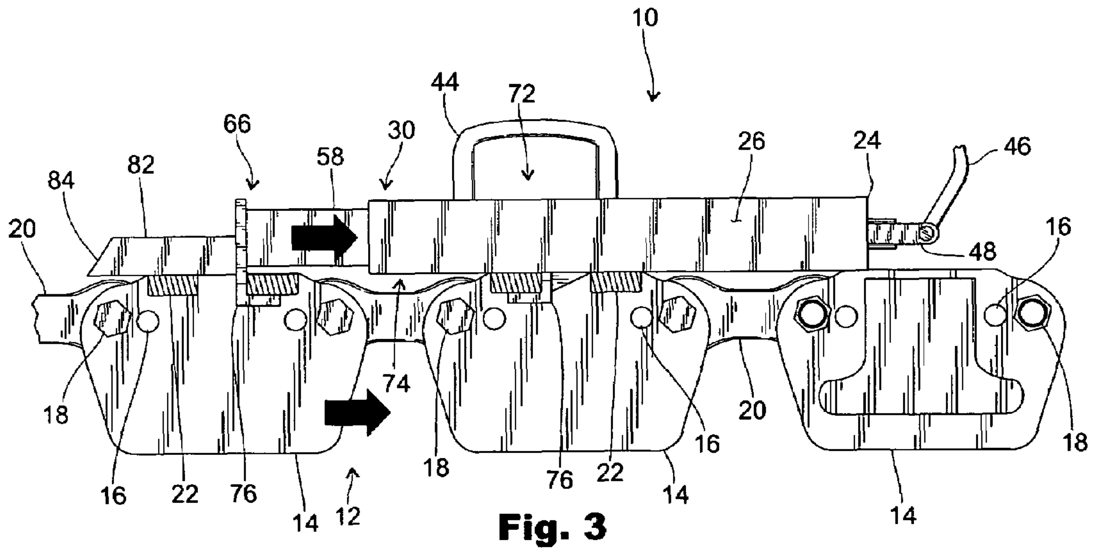
FIG. 3 is a side elevational view of the tool first shown in FIG. 1 illustrating the movement of the telescoping portion of the tool for decreasing the distance between adjacent track sections of the endless track to facilitate the installation and removal thereof.

Shown in FIGS. 2 and 3 is a representative portion of an endless steel track 12 of a skid loader (not shown). The endless steel track 12 is comprised of adjacent and successive individual track sections, and FIGS. 2 and 3 show three successive track sections 14. Each track section 14 includes a number of bolt holes 16 through which bolts 18 are inserted for securing the connecting links 20 that are used to hold successive track sections 14 to each other. Tightening the tension on the track 12 is one primary type of maintenance and this is accomplished by removing and reinserting the bolts 18 in the appropriate bolt holes 16 of adjacent track sections 14 so that the distance between adjacent track sections 14 is decreased. Each track section 14 includes at least one pair of transversely extending crossbars 22 that connect to opposite track sections 14 (not shown) for maintaining the shape of the endless track 12 on the wheels of the skid loader.

Figure 4:
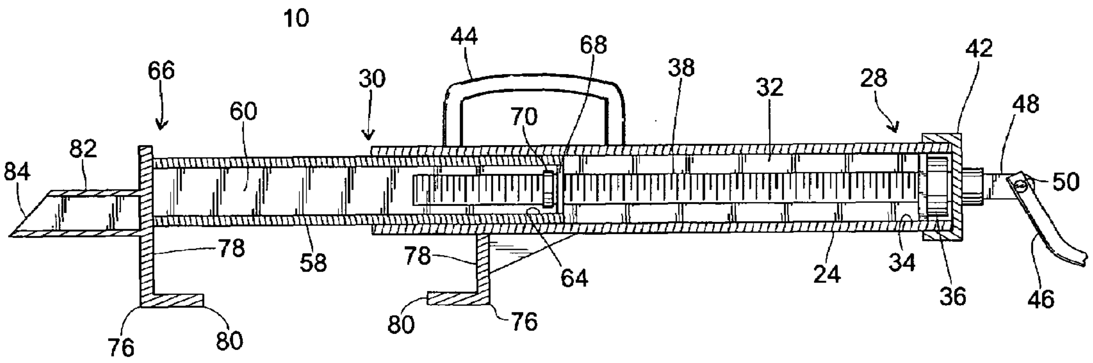
FIG. 4 is a sectioned side elevational view of the tool taken along lines 4-4 of figure and illustrating the arrangement of internal structural elements of the tool.
Figure 5:
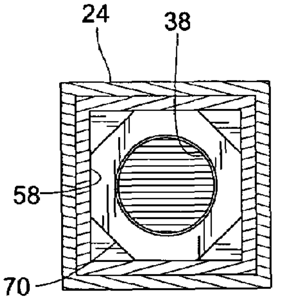
FIG. 5 is a sectioned elevational view of the tool taken along lines 5-5 of FIG. 1.
Figure 6:
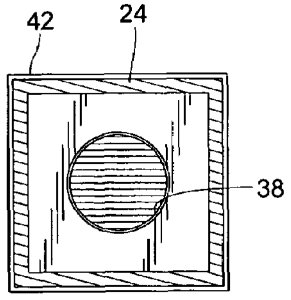
FIG. 6 is a sectioned elevational view of the tool taken along lines 6-6 of FIG. 1.

Thus, as shown in FIGS. 1-6, the tool 10 for performing maintenance—such as the installation, removal or tightening (tensioning)—on the endless tracks 12 includes a first tubular elongated member 24 of generally square-shaped cross sectional configuration as illustrated in FIGS. 5 and 6. The first tubular member 24 preferably is two inches and 12 inches in cross section with the continuous body wall 26 having a thickness of 3/16ths of an inch. The first tubular member 24 includes a first handle end 28 and an opposite distal second end 30.

Figure 1:
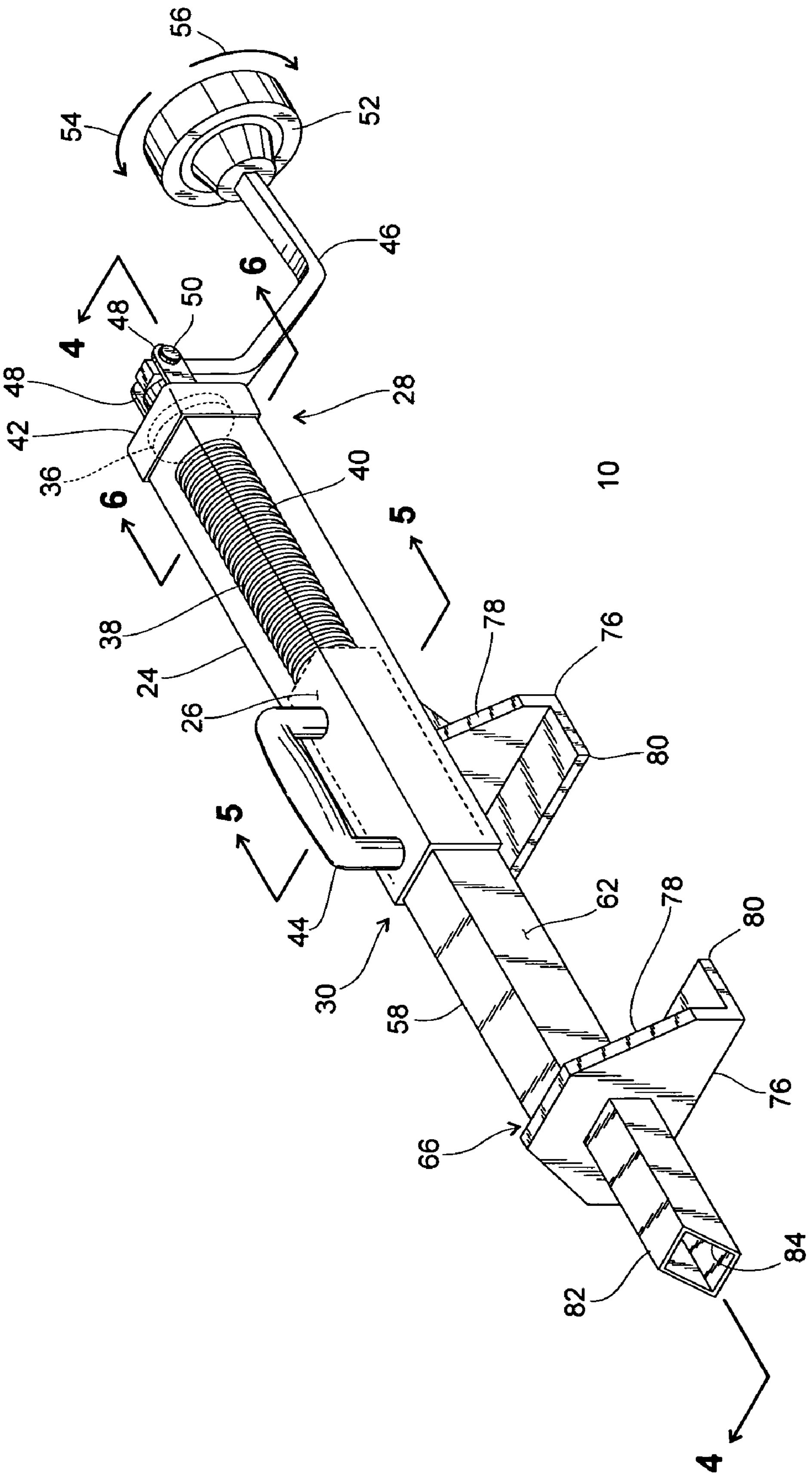
FIG. 1 is a perspective view of the tool for performing maintenance on endless steel tracks of machinery and equipment and in which a portion of the tool is cut away to reveal certain internal structural elements.

As shown in FIGS. 1, 4 and 6, the first tubular member 24 includes a bore 32 extending therethrough and an interior inner end 34. Disposed within the interior inner end 34 is a thrust bearing 36 and the thrust bearing 36 engages a threaded rod 38 and maintains the coaxial disposition of the threaded rod 38 within the bore 32. The length of the threaded rod 38 is nearly equal to the length of the first tubular member 24 and the threads 40 of the threaded rod 38 are preferably right-handed threads. An end cap member 42 is placed on the first tubular member 24 at the first handle end 28 thereof for closing off the bore 32. A carrying handle 44 is disposed on the first tubular member 24 adjacent the second distal end 30 to facilitate the portability and placement of the tool 10 on the endless track 12 when maintenance is being performed on the track 12.

As shown in FIGS. 1-4, a handle 46 rearwardly extends from the end cap member 42 and is clevis mounted thereon by a pair of spaced-apart brackets 48 and a pivot pin 50. Pivot pin 50 secures the mounting end of the handle 46 to the brackets 48 and also allows for the removal of the handle 46 from the brackets 48 if desired. The opposite end of the handle 46 includes a knob 52 for ease of gripping, holding and turning the handle 46 when performing maintenance on the track 12. A handle extension of the handle 46 extends through the end cap member 42 for interconnection via the thrust bearing 36 to the threaded rod 38 so that rotation of the handle 46 in the clockwise or counterclockwise direction results in the concomitant rotation of the threaded rod 38 in the same direction. FIG. 1 illustrates a clockwise directional arrow 54 and a counterclockwise directional arrow 56. The handle 46 is thus capable of movement in two planes that are generally perpendicular to each other: rotational movement in the clockwise and counterclockwise directions 54 and 56 and pivotal movement on the pivot pin 50 and brackets 48 that is transverse to the axis of the bore 32.

Illustrated in FIGS. 1-6 is a second tubular member 58 that is partially received within the bore 32 of the first tubular member 24 for linear telescoping movement relative to the first tubular member 24. The second tubular member 58 is thus capable of selective slidable extension and selective slidable retraction coaxial with the bore 32 of the first tubular member 24 to accomplish the installation, removal or tightening of the endless steel tracks 12. The second tubular member 58 includes an internal second bore 60 coaxial with the bore 32 of the first tubular member 24 and thus the second tubular member 58 is in coaxial alignment with the first tubular member 24. The second tubular member 58 is preferably of two inch square tubing and the continuous wall 62 of second tubular member 58 has a thickness of 3/16ths of an inch. The second tubular member 58 includes an inner end 64 that is always contained within and encompassed by the first tubular member 24 and an opposite outer end 66 that always projects outwardly from the distal second end 30 of the first tubular member 24 irrespective of the amount of retraction or withdrawal of the second tubular member 58 within the bore 32 of the first tubular member 24. An internal end plate 68 closes off the internal second bore 60 at the inner end 64 and fixedly mounted within the internal second bore 60 immediately adjacent and in front of the end plate 68 is a threaded nut 70. The threaded rod 38 is coaxial to bore 32 and internal second bore 60, and extends through the threaded nut 70 and is engaged by—and engages and rotates against—the threaded nut 70. In addition, the pitch of the threads of the rod 38 working in conjunction with and against the threaded nut 70 during the rotation of the threaded rod 38 within the nut 70—and bores 32 and 60—allows for the take up or release of tension in fine increments of one thousandths of an inch, i.e., incremental linear retraction or withdrawal in gradations of thousandths of an inch (0.001 inches).

As shown in FIGS. 1-4, the tubular members 24 and 58 combine to form a continuous upper surface 72 and a continuous lower surface 74 with the carrying handle 44 projecting from the upper surface 72 of the tool 10. In order to physically adjust the endless tracks 12 for performing the abovedescribed maintenance, the lower surface 74 of the tool 10 includes a pair of spaced-apart track bar hooks 76. The hooks 76 are L-shaped and each hook 76 includes a vertical portion 78 and a horizontal hooking portion 80 with the horizontal hooking portions 80 projecting inwardly toward each other. More specifically, the track bar hook 76 mounted to the undersurface 74 of the first tubular member 24 is located at the distal second end 30 and is stationary. The track bar hook 76 mounted to the undersurface 74 for the second tubular member 58 is located at the outer end 66 thereof and moves concomitant with the movement of the second tubular member 58 during the extension and retraction of the second tubular member 58. Extending from the horizontal portion 80 of the track bar hook 76 for the second tubular member 58 is a projection 82 having a beveled end or tip 84, and the projection 82 is coaxial with the first tubular member 24 and the second tubular member 58.

In operation and with reference to FIGS. 2 and 3 for removal of the entire endless track 12 the lower surface 74 of the tool 10 would first be placed upon successive track sections 14 and oriented so that each hook 76 is hooked about adjacent cross bars 22 of two successive track sections 14. The handle 46 would then be rotated in the clockwise direction 54 slidably withdrawing the second tubular member 58 within the first tubular member 24 and thereby causing the hooks 76 to pull the cross bars 22 of the successive track sections 14 toward each other for physically decreasing the distance between the two successive track sections 14. These simultaneously occurring actions cause a relaxation of tension on the four bolts 18 and two connecting links 20 that hold the two successive track sections 14 together. (Note: FIGS. 2 and 3 are side elevational views so only two of the bolts 18 and one connecting link 20 is shown; the other bolts 18 and connecting link 20 are on the opposite side of the track sections 14.) With the tension thus relieved the bolts 18 can be removed. The handle 46 is then rotated in the counter clockwise direction 56 for slidably extending the second tubular member 58 relative to the first tubular member 24. This counter clockwise rotation causes the hook 76 on the second tubular member 58 to draw away from the hook 76 of the first tubular member 24 until all tension on the track 12 is removed so that the entire endless track 12 can be removed.

For installation of the endless track 12 on the wheels of the skid loader the track 12 is pulled up over the front and rear wheels (tires) where the splice is centered on top and between the wheels. The tool 10 is then placed on the track 12 so that the lower surface 74 abuts the track 12 so that the track bar hooks 76 can be hooked about the cross bars 22 of two adjacent and successive track sections 14 (on either side of the splice on the track). The handle 46 would then be rotated in the clockwise direction 54 thus turning the rod 38 against nut 70 and causing the second tubular member 58 to retract within the first tubular member 24 resulting in the hooks 76 being drawn toward each other and decreasing the distance between the adjacent track sections 14. The second tubular member 58 is retracted within the first tubular member 24 until the bolt holes 16 of the adjacent track sections 14 are aligned and the track 12 is properly tensioned. The bolts 18 would then be installed in the appropriately aligned bolt holes 16 for securing the connecting links 20 to the adjacent and successive track sections 14 for holding the track sections 14 together. The handle 46 would then be rotated in the counter clockwise direction 56 thereby rotating the rod 38 in the opposite direction and causing the extension of the second tubular member 58 relative to the first tubular member 24. The hooks 76 are thus drawn apart thereby allowing the release of the hooks 76 from the cross bars 22 so that the tool 10 can be removed from the track 12. The mechanical retraction or extension of the second tubular member 58 with respect to the first tubular member 24 results from the rotational engagement—in either the clockwise and counterclockwise directions—of the right-handed threaded rod 38 against the fixedly mounted threaded nut 70 that is disposed at the inner end 64 of the second tubular member 58.

The tool 10 of the present invention thus provides increased leverage for keeping the track sections 14 in a level plane while performing maintenance thereon by maintaining the continuous contact of the lower surface 74 of the tool 10 against the endless tracks 12. This allows the tool 10 to quickly, easily and reliably take up or release slack in the tracks 12 making installation or removal of the tracks 12 easier and less time consuming.

I claim:

1. A tool for performing maintenance on the endless tracks of a tracked vehicle, comprising:

a first elongated tubular member having a first handle end and an opposite second distal end;

a bore extending through the first tubular member from the first handle end to the opposite second distal end;

a thrust bearing disposed within the bore at the first handle end;

a second elongated tubular member disposed within the bore of the first tubular member for linear slidable extension and retraction relative to the first tubular member;

the second elongated tubular member including an inner end that is enclosed within the bore of the first tubular member, an opposite outer end that projects outwardly from the second distal end of the first tubular member, and an internal second bore coextensive in length with the second tubular member and coaxial with the bore of the first tubular member;

a threaded nut fixedly mounted within the second bore of the second tubular member adjacent the inner end thereof;

a rotatable threaded rod mounted at the first handle end of the first tubular member and coaxially extending through the bore of the first tubular member and the internal second bore of the second tubular member for engagement with the fixedly mounted threaded nut;

a handle mounted at the first handle end of the first tubular member being interconnected to the threaded rod and capable of clockwise rotation and counterclockwise rotation relative to the coaxial alignment of the bore of the first tubular member and the internal second bore of the second tubular member;

a pair of track bar hooks with one track bar hook mounted to the first tubular member and the other track bar hook mounted to the second tubular member; and rotation of the handle in the clockwise direction causes the rotation of the threaded rod against the nut thereby resulting in the telescopic retraction of the second tubular member within the first tubular member and the track bar hooks to decrease in distance from each other and rotation of the handle in the counterclockwise direction causes the rotation of the threaded rod against the nut in the opposite direction thereby resulting in the telescopic extension of the second tubular member from the first tubular member and the track bar hooks to be drawn away from each other.

2. The tool for performing maintenance on the endless tracks of the tracked vehicle of claim 1 wherein the threaded rod includes right-handed threads.

3. The tool for performing maintenance on the endless tracks of the tracked vehicle of claim 2 further comprising an end cap member that is placed on the first tubular member at the first handle end for closing off the bore of the first tubular member.

4. The tool for performing maintenance on the endless tracks of the tracked vehicle of claim 3 further comprising a pair of spaced-apart brackets that are mounted to the end cap member.

5. The tool for performing maintenance on the endless tracks of the tracked vehicle of claim 4 further comprising a pivot pin mounted to and extending between the brackets.

6. The tool for performing maintenance on the endless tracks of the tracked vehicle of claim 5 wherein the handle is mounted to the pivot pin and on the brackets for pivotal movement thereon.

7. The tool for performing maintenance on the endless tracks of the tracked vehicle of claim 6 further comprising a carrying handle mounted on the first tubular member and providing for the transport and portability of the tool.

8. A tool for performing maintenance on an endless track of a tracked vehicle, comprising:

a first elongated tubular member having a first handle end and an opposite second distal end;

a bore extending through the first tubular member;

a thrust bearing disposed within the bore adjacent the first handle end of the first tubular member;

a second elongated tubular member for disposition within the bore of the first tubular member and capable of linear slidable extension and retraction relative to the first tubular member;

the second elongated tubular member including an inner end that is enclosed within the bore of the first tubular member, an opposite outer end that projects outwardly from the second distal end of the first tubular member, and an internal second bore coextensive in length with the second tubular member and coaxial with the bore of the first tubular member;

a threaded nut fixedly mounted within the second bore of the second tubular member adjacent the inner end thereof;

a rotatable threaded rod mounted at the first handle end of the first tubular member and coaxially extending through the bore of the first tubular member and the internal second bore of the second tubular member for engagement with and extension through the threaded nut;

a handle mounted at the first handle end of the first tubular member being interconnected to the threaded rod and capable of clockwise rotation and counterclockwise rotation relative to the coaxial alignment of the first tubular member and the second tubular member;

a pair of track bar hooks with one track bar hook mounted to the first tubular member and the other track bar hook mounted to the second tubular member;

the first tubular member and the second tubular member combining to form a continuous upper surface and an opposite continuous lower surface; and wherein rotation of the handle in the clockwise direction causes the rotation of the threaded rod against the nut thereby resulting in the telescopic retraction of the second tubular member within the first tubular member and the track bar hooks to draw together for tightening the tension on the endless track and rotation of the handle in the counterclockwise direction causes the rotation of the threaded rod against the nut in the opposite direction thereby resulting in the telescopic extension of the second tubular member from the first tubular member and the track bar hooks to draw apart for loosening the tension on the endless track.

9. The tool for performing maintenance on the endless track of the tracked vehicle of claim 8 wherein the threaded rod includes right-handed threads.

10. The tool for performing maintenance on the endless track of the tracked vehicle of claim 9 further comprising an end cap member that is placed on the first tubular member at the first handle end for closing off the bore of the first tubular member.

11. The tool for performing maintenance on the endless track of the tracked vehicle of claim 10 further comprising a pair of spaced-apart brackets that are mounted to the end cap member.

12. The tool for performing maintenance on the endless track of the tracked vehicle of claim 11 further comprising a pivot pin mounted and extending between the brackets.

13. The tool for performing maintenance on the endless track of the tracked vehicle of claim 12 wherein the handle is mounted to the pivot pin and on the brackets for pivotal movement thereon.

14. The tool for performing maintenance on the endless track of the tracked vehicle of claim 13 further comprising a carrying handle mounted on the upper surface of the first tubular member to facilitate the transport and portability of the tool.

15. The tool for performing maintenance on the endless track of the tracked vehicle of claim 14 wherein the handle is rotatably interconnected to the threaded rod by the thrust bearing for rotating the threaded rod and causing the linear slidable extension and linear slidable retraction of the second tubular member relative to the first tubular member.

16. A tool for the installation, removal and tightening of the steel tracks on a tracked vehicle, comprising:

a first elongated tubular member having a first handle end and an opposite second distal end;

a bore extending through the first tubular member;

a thrust bearing disposed within the bore adjacent the first handle end of the first tubular member;

a second elongated tubular member for disposition within the bore of the first tubular member and capable of linear slidable extension and retraction relative to the first tubular member;

the second elongated tubular member including an inner end that is enclosed within the bore of the first tubular member, an opposite outer end that projects outwardly from the second distal end of the first tubular member, and an internal second bore coextensive in length with the second tubular member and coaxial with the bore of the first tubular member;

a threaded nut fixedly mounted within the second bore of the second tubular member adjacent the inner end thereof;

a rotatable threaded rod mounted at the first handle end of the first tubular member and coaxially extending through the bore of the first tubular member and the internal second bore of the second tubular member for engagement with and extension through the threaded nut;

a handle mounted at the first handle end of the first tubular member being interconnected to the threaded rod and capable of clockwise rotation and counterclockwise rotation relative to the coaxial alignment of the first tubular member and the second tubular member;

a pair of track bar hooks with one track bar hook mounted to the first tubular member and the second track bar hook mounted to the second tubular member;

the first tubular member and the second tubular member combining to form a continuous upper surface and an opposite continuous lower surface; and wherein rotation of the handle in the clockwise direction causes the rotation of the threaded rod against the nut thereby resulting in the retraction of the second tubular member within the first tubular member and the drawing of the track bar hooks toward each other for tightening the tension on the endless tracks and rotation of the handle in the counterclockwise direction causes the rotation of the threaded rod against the nut in the opposite direction thereby resulting in the extension of the second tubular member from the first tubular member and the drawing apart of the track bar hooks for loosening the tension on the endless tracks.

17. The tool for the installation, removal and tightening of the steel tracks on the tracked vehicle of claim 16 wherein the threaded rod includes right-handed threads.

18. The tool for the installation, removal and tightening of the steel tracks on the tracked vehicle of claim 17 wherein the pitch of the threads of the threaded rod allow for the linear retraction and extension of the second tubular member relative to the first tubular member in increments measured in one thousandth of an inch.

* * * * *